United States Patent [19]

Braly et al.

[11] 4,363,516
[45] Dec. 14, 1982

[54] THRUST SUPPORT FOR BICYCLE SEATS

[76] Inventors: Douglas E. Braly; James A. Stein, both of 1875 E. Kirkland La., Tempe, Ariz. 85281

[21] Appl. No.: 180,100
[22] Filed: Aug. 21, 1980
[51] Int. Cl.³ .............................................. B62J 1/00
[52] U.S. Cl. .............................. 297/195; 297/DIG. 9
[58] Field of Search ................. 297/195, 383, DIG. 9, 297/355, 352, 361; 403/340, 339

[56] References Cited

U.S. PATENT DOCUMENTS

| 553,722 | 1/1896 | Prall . | |
|---|---|---|---|
| 592,783 | 2/1897 | Hess | 297/383 X |
| 636,222 | 10/1891 | Killen . | |
| 1,041,087 | 10/1913 | Howard . | |
| 1,146,676 | 7/1915 | Weed | 297/195 UX |
| 1,168,253 | 1/1916 | Friel . | |
| 1,190,828 | 7/1916 | Weed . | |
| 1,216,029 | 2/1917 | Whitaker | 297/DIG. 9 |
| 3,425,745 | 2/1969 | Michels | 297/195 |
| 3,658,380 | 4/1972 | Townsend | 297/DIG. 9 |
| 3,970,345 | 7/1976 | Holcomb . | |
| 4,141,587 | 2/1979 | Holcomb | 297/195 |

FOREIGN PATENT DOCUMENTS

| 599972 | 1/1926 | France . |
| 1027919 | 5/1953 | France . |
| 1898 | of 1898 | United Kingdom . |

Primary Examiner—Roy D. Frazier
Assistant Examiner—Peter A. Aschenbrenner
Attorney, Agent, or Firm—Warren F. B. Lindsley

[57] ABSTRACT

A thrust support for bicycles against which the rider may press his buttocks at the same time he exerts the muscular force of his legs upon the pedals so as to accomplish additional driving power, thereby exerting less upper body energy and maintaining proper seat position.

5 Claims, 11 Drawing Figures

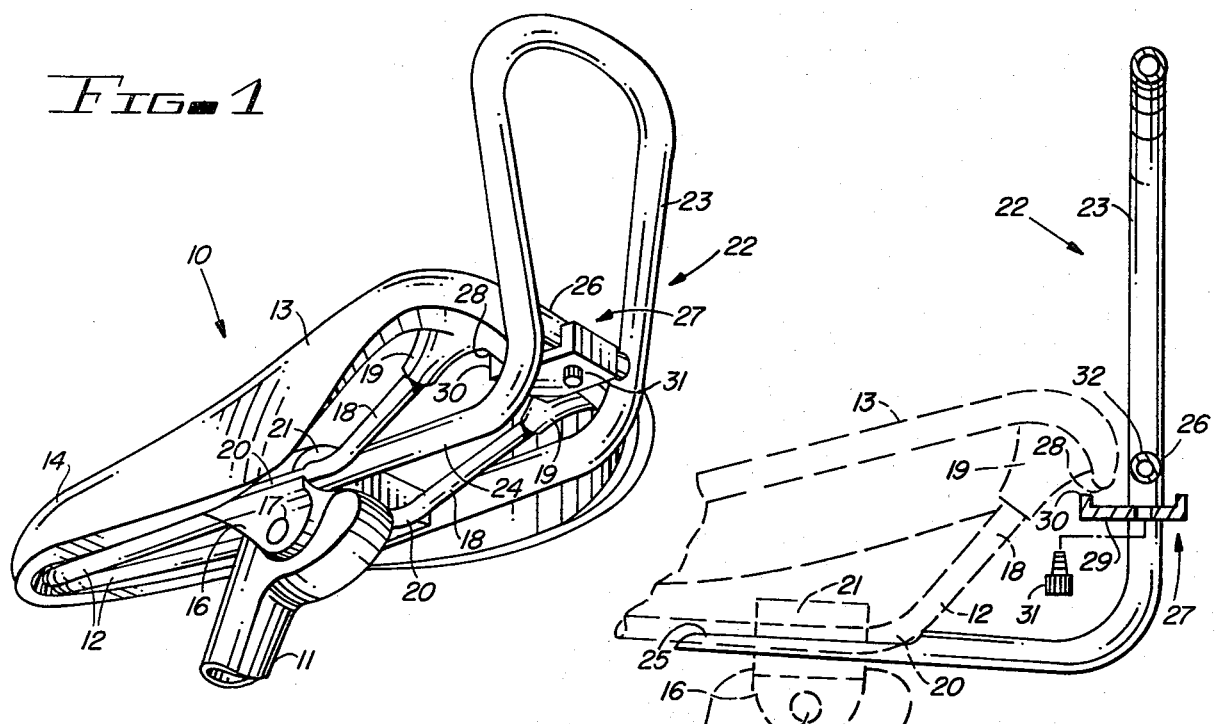
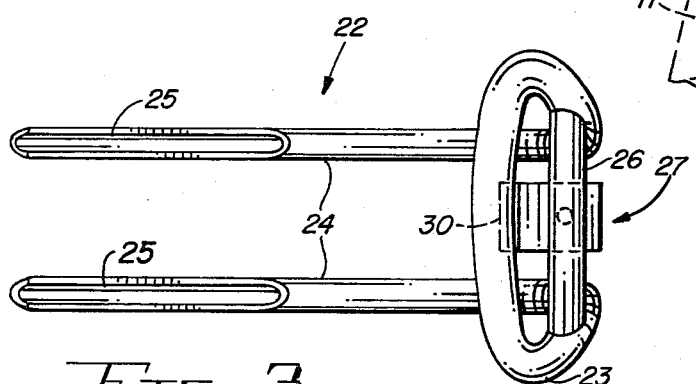
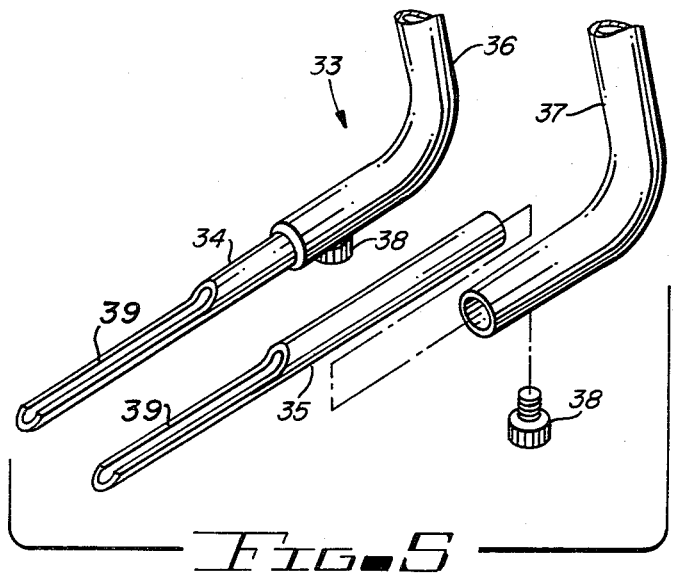
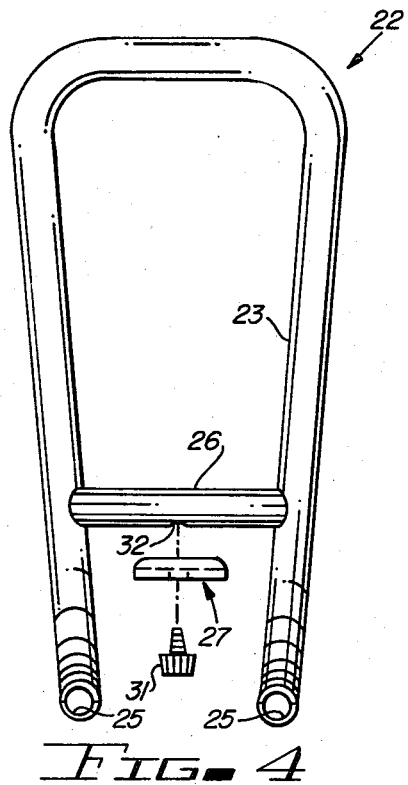

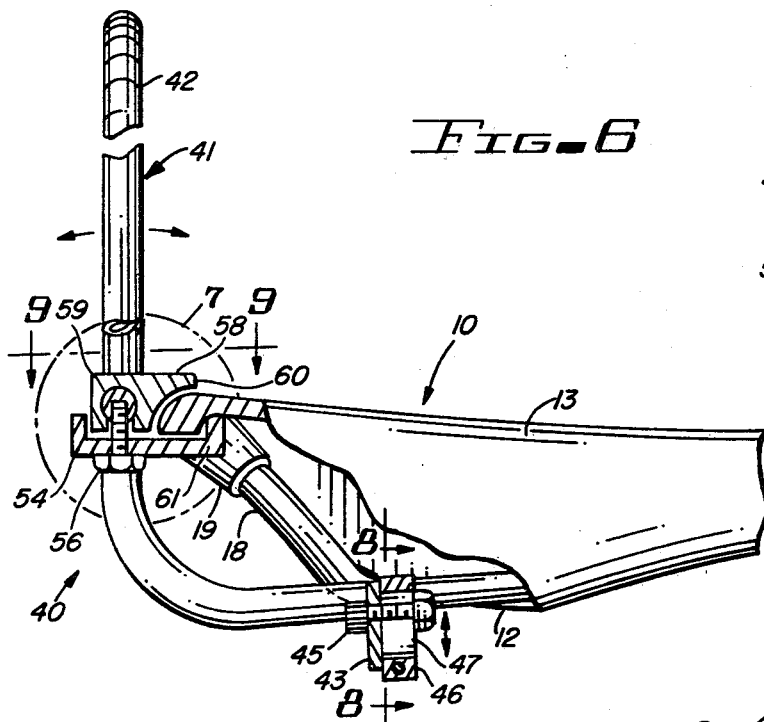
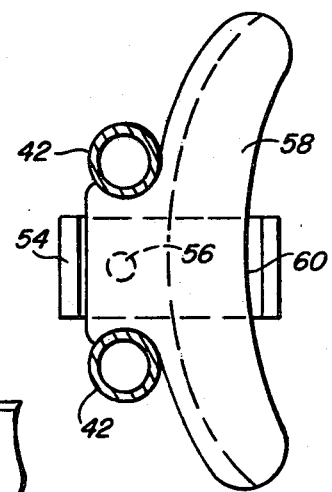
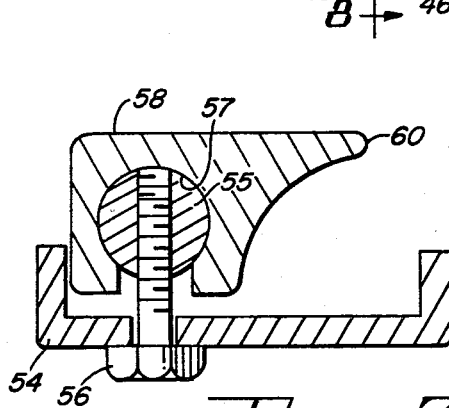
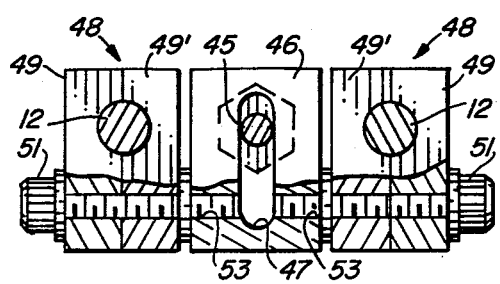
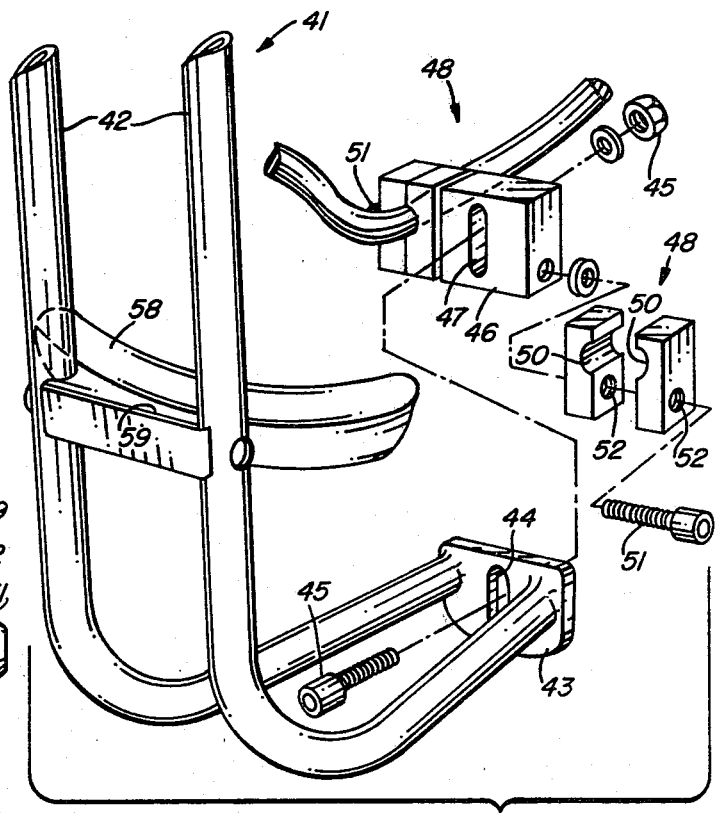
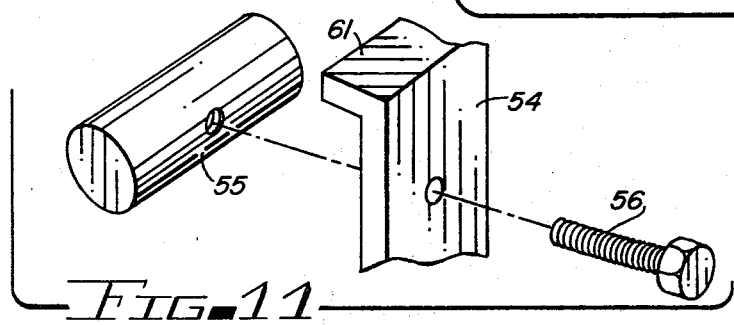

THRUST SUPPORT FOR BICYCLE SEATS

BACKGROUND OF THE INVENTION

The invention relates to seats for wheeled vehicles, such as bicycles and motorcycles, and more particularly to seats having thrust supports for increasing the comfort and leg thrust of the cyclist.

Conventional bicycle seats have been modeled after, and designed for, racing bicycles and their principal aim is high speed efficiency. Such seats do not afford much buttocks support to average riders and do not augment the leg thrust. Some conventional seats have provided minimal spring support for the saddle sheath but none has provided adequate support for the buttocks commensurate with improving the efficiency of the average rider.

Accordingly, a seat for cycles is needed which provides effective leg thrust when used with pedaled cycles, but affords back support and leg motion clearance.

DESCRIPTION OF THE PRIOR ART

U.S. Pat. No. 553,722 discloses a back support for bicycle seats employing a rigid support overhanging the seat.

U.S. Pat. No. 592,783 discloses an adjustable backrest for bicycle seats.

U.S. Pat. No. 636,222 discloses a driving back for velocipedes employing telescopic tubes extending from the back to the frame which are independently adjustable.

U.S. Pat. No. 1,041,087 discloses a saddle attachment for a motorcycle which may be lowered at will by the rider.

U.S. Pat. No. 1,190,828 discloses a backrest for bicycles, motorcycles or the like which may be swung downwardly out of the way for mounting or dismounting purposes.

U.S. Pat. No. 1,168,253 discloses a back for motorcycle saddles employing springs for connecting a pair of brackets to the rear portion of the saddle.

U.S. Pat. No. 3,970,345 discloses a seat having a backrest that adjusts forward and backward on the frame.

U.S. Pat. No. 4,141,587 discloses a backrest curving upwardly from the base. A pair of spaced leaf springs intervene between the pad and the seat in the zone where the back and backrest join.

British Pat. No. 2,408 discloses a backrest employing a tube extending through a saddle pin for adjustment purposes.

French Pat. No. 599,972 discloses a backrest mounted between a coil spring interconnecting the seat and frame of the structure.

French Pat. No. 1,027,919 discloses a pad forming a backrest for a coil biased saddle.

SUMMARY OF THE INVENTION

This invention relates to thrust supports for bicycle seats for increasing the efficiency of the rider.

It is, therefore, one object of this invention to provide a new and improved backrest and thrust support for attachment to standard seats of bicycles.

Another object of this invention is to provide a new and improved thrust support for cycles against which the rider may press his buttocks at the same time he exerts the muscular force of his legs upon the pedals so as to accomplish additional drive power.

A further object of this invention is to provide a new and improved backrest for bicycles which may be easily mounted on most modern day cycles.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

This invention may be more readily described by reference to the accompanying drawing in which:

FIG. 1 is a perspective view of a seat and backrest for a bicycle and embodying the invention;

FIG. 2 is a cross-sectional view of the backrest showing the seat in dash lines;

FIG. 3 is a top view of the backrest shown in FIGS. 1 and 2;

FIG. 4 is a front view of the backrest shown in FIGS. 1-3;

FIG. 5 is an exploded partial perspective view of a modification of the backrest shown in FIGS. 1-4;

FIG. 6 is a side view partially in section of a modification of the seat and thrust support shown in FIGS. 1-4;

FIG. 7 is an enlarged view of the circled part shown in FIG. 6;

FIG. 8 is a cross-sectional view of FIG. 6 taken along the line 8—8;

FIG. 9 is a cross-sectional view of FIG. 6 taken along the line 9—9;

FIG. 10 is an enlarged exploded perspective view of the thrust support shown in FIG. 6; and FIG. 11 is an exploded perspective view of the cylindrical seat shown in FIGS. 6 and 7.

DESCRIPTION OF THE PREFERRED EMBODIMENTS

Referring more particularly to the drawing by characters of reference, FIG. 1 discloses a saddle or seat 10 of a conventional cycle such as, for example, a bicycle (not shown) which has a seat post projecting above its frame member. The bicycle seat 10 in accordance with the invention is secured to the bicycle at the top of the seat post usually by inserting the seat post coupling 11 into the seat post in the usual manner. This seat may be of a racing configuration which normally has no backrest and is narrow transversely affording good leg freedom but little weight support area and minimum resilience from its frame 12. The seat is provided with a cover 13 tapering into a narrow forward tongue 14.

The seat post coupling 11 is securely fastened inside of the hollow top of the seat post by a set screw or the like (not shown) with the frame 12 of the seat pivotally connected thereto by a pair of spaced flanges 16 fastened to the frame 12 and pivotally secured by a rod 17 extending through the flanges and coupling 11 in the manner shown. Rod 17 may have a head at one end and a threaded end at the other end for receiving a nut for securing the seat in a given arrangement with the seat post of the bicycle, or it may float to fit the position of the rider.

As shown in FIG. 1, the rods forming frame 12 are secured at their ends 18 to couplings 19 formed in the seat cover or frame and at their other ends 20 to the seat post coupling 11 by a clamp 21 in the usual manner.

In accordance with the invention claimed, a thrust support or backrest 22 is provided comprising a U- shaped configuration 23 having its leg 24 bent laterally thereto at substantially a right angle to form a U-shaped backrest or thrust support portion and a pair of spaced legs forming a clamping portion. This backrest may be formed of a hollow tubular material such as aluminum or stainless steel with the top of the spaced legs 24 cut away to reveal their concave hollow interiors 25, as shown in FIG. 3. This cut away portion is designed to fit under frame 12 in the clamp configuration so that when the clamp is secured, the backrest 22 will be tightly held in place.

In order to more firmly secure the backrest to seat 10, a cross bar 26 extending between the legs of the U-shaped configuration is secured by a clamp 27 to the back edge 28 of the cover 13 of the seat configuration. This clamp comprises a plate 29 having an edge 30 which hooks underneath edge 28 to hold edge 28 to the cross bar 26 when a threaded bolt or screw 31 is extended through plate 29 into a threaded swivel arrangement with an aperture 32 in cross bar 26, more clearly shown in FIG. 2.

FIG. 5 discloses a modification of the backrest 22 shown in FIGS. 1-4 wherein the backrest 33 differs from backrest 22 by merely providing the bent leg portion of backrest 33 as telescopic parts 34 and 35 fitting into the remainder of the leg portions 36 and 37 and held therein by set screws or bolts 38 extending through legs 36 and 37 and into contact with part 34 and 35. In this manner, the legs of the backrest can be extended or shortened to fit different size seats. As noted, parts 34 and 35 are cut away at their ends to provide concave surfaces 39 of the same type and for the same purpose as the hollow interiors 25 of the legs of the backrest 22.

FIGS. 6-11 disclose a further modification of the thrust support or backrest for bicycle seats shown in FIGS. 1-5 wherein a thrust support or backrest 40 is shown mounted on the seat 10 of a bicycle (not shown).

The backrest, as shown in FIGS. 6-10, comprises a U-shaped configuration 41 having its legs 42 bent laterally thereto at substantially a right angle to form a U-shaped backrest or thrust support portion and a pair of spaced legs forming a clamping portion. As mentioned heretofore, this backrest may be formed of a hollow tubular material, such as aluminum or stainless steel, with the top of the spaced legs cut away to reveal their hollow interiors, as shown in FIG. 10.

The clamping portion comprises a plate 43 suitably secured such as by welding to the terminal ends of legs 42, which plate is slotted vertically at 44 so as to receive therein a threaded nut and bolt arrangement 45. This nut and bolt arrangement also extends through a further plate 46. Plate 46 is provided with a slot 47 similar to slot 44 in plate 43 so that lateral movement between the plates is possible when the nut and bolt arrangement 45 is loosened.

As noted from FIGS. 6, 8 and 10, plate 46 is secured to the rails of frame 12 of the bicycle seat 10 by a pair of identical clamps 48, one secured to each end of the plate. Each clamp 48 comprises a pair of cooperating plates 49, 49' which are each grooved at 50 to form, when justapositioned, a cylindrical hole therethrough, as shown in FIG. 10, for receiving therein one of the rails of seat 10, as shown in FIGS. 6 and 8. The plates 49, 49' are held together by a threaded bolt 51 which extends through apertures 52 in plates 49, 49' and into a threaded hole 53 in plate 46, as shown. By loosening bolt 51, the seat may be adjustably positioned and when bolts 51 of each clamp 48 are tightened, the seat is firmly attached to the backrest 40.

As shown and described in FIGS. 1-5, thrust support or backrest 40 is adjustably secured to the back edge of seat 10, as shown in FIG. 6. This securing means comprises a clamp 54 which is threadedly attached to a cylindrically shaped nut 55 by a bolt 56 extending through the clamp 54 and into nut 55. Nut 55 is positioned within a cylindrical opening 57 formed in an arcuate shaped retainer member 58. This retainer member comprises a flange 59 extending laterally from member 58 with its ends suitably secured as by welding to the juxtapositioned edges of the legs 42 of the U-shaped configuration 41.

The arcuate edges of retainer member 58 are provided with a lip 60 which lies over the top of the edge of cover 13 of seat 10 with the ridge 61 of clamp 54 extending upwardly adjacent the under edge of the cover 13 of seat 10 so as to hold the edge of the seat from movement relative to the retainer member 58 when the relative parts thereof are tightly clamped in position. As should be noted, the under edge of the arcuate portion of the retainer member provides a clamping surface, but also permits no relative motion because of the resiliency of the seat cover.

Thus, it should be noted that the structure shown in FIGS. 6-11 has a number of adjustment points which permit a number of seat and backrest adjustments to aid in obtaining effective thrust support for the user.

Although but a few embodiments of the present invention have been illustrated and described, it will be apparent to those skilled in the art that various additional changes and modifications may be made therein without departing from the spirit of the invention or from the scope of the appended claims.

What is claimed is:

1. A thrust support for attachment to a conventional cycle seat comprising:
   a U-shaped member having a pair of spaced legs interconnected at one end by a bight,
   said member comprising a hollow tubular configuration bent along its length to cause the free end of its legs to extend laterally therefrom in a common direction,
   means secured to and extending between the legs of said member,
   said means detachably engaging the back edge of the seat for limiting relative motion between the seat and the thrust support, and
   the free ends of each of said legs being cut away to form concave configurations along a given part of their lengths which surround a part of a tubular frame of the seat when the thrust support is clamped in position.

2. The thrust support set forth in claim 1 wherein:
   said means comprises a swivel connection for adjustably positioning said means relative to the seat frame.

3. The thrust support set forth in claim 1 wherein:
   each of said legs comprises a pair of telescopic members, and
   means for securing the telescopic member in given relative positions.

4. The thrust support set forth in claim 1 wherein:
   said means comprises an arcuate shaped retainer having a lip around its arcuate edge for overlying the back edge of the seat, and a clamp for threaded connection to said retainer and having a flange for engaging the under surface of the portion of the seat held by said lip of said retainer.

5. The thrust support set forth in claim 4 wherein:

said retainer is provided with a swivel connection, and said clamp is threadedly connected to said swivel connection.

* * * * *